(12) United States Patent
Kott

(10) Patent No.: US 6,989,116 B2
(45) Date of Patent: *Jan. 24, 2006

(54) COMPRESSED COMPOSITE PRODUCT FORMATION AND TRANSPORT METHOD

(75) Inventor: Norbert Kott, Fort Langley (CA)

(73) Assignee: Weyerhaeuser Company, Federal Way, WA (US)

( * ) Notice: Subject to any disclaimer, the term of this patent is extended or adjusted under 35 U.S.C. 154(b) by 254 days.

This patent is subject to a terminal disclaimer.

(21) Appl. No.: 10/368,950

(22) Filed: Feb. 18, 2003

(65) Prior Publication Data

US 2004/0159982 A1   Aug. 19, 2004

(51) Int. Cl.
*B29C 43/22* (2006.01)
*B29C 59/00* (2006.01)
(52) U.S. Cl. .......................... 264/69; 264/70; 264/120
(58) Field of Classification Search ........ 264/109–128, 264/69, 70; 100/38, 42
See application file for complete search history.

(56) References Cited

U.S. PATENT DOCUMENTS 4,923,656 A * 5/1990 Held .......................... 264/70
6,312,632 B1  11/2001 Graf

FOREIGN PATENT DOCUMENTS

DE       196 02 536 A1   7/1996
WO       WO 92/15447 A1   9/1992

* cited by examiner

*Primary Examiner*—Stephen J. Lechert, Jr.

(57) ABSTRACT

The present invention is a method of forming a compressed product. The method includes introducing a material into a press. The material has a flow direction through the press. The press is arranged to have at least one platen oscillating between a compression phase and a release phase. The at least one platen is configured to impart a compressive force onto the material during the compression phase such that the force is applied initially at an acute compression vector angle relative to the material flow direction. As a function of the angled compressive force, the material is transported a distance through the press and then released during the release phase.

20 Claims, 6 Drawing Sheets

COMPRESSED COMPOSITE PRODUCT FORMATION AND TRANSPORT METHOD

FIELD OF THE INVENTION

This invention relates generally to methods of forming compressed products and, more specifically to a method of forming a compressed composite product with oscillating compression.

BACKGROUND OF THE INVENTION

Oriented strand board, parallel strand lumber and other engineered wood products produced from discrete wood elements are produced in a press by depositing a mat of resin coated wood elements within the press and applying a compressive force to the mat. Heat from a variety of sources is added to substantially cure the resin while the mat is within the press. The heat may be added in the form of microwave energy, radio frequency energy, steam injection or the like.

As depicted in FIG. 1, current press systems includes a pair of opposed platens 40a configured to continuously compress a material 38a into a desired shape. Adjacent each platen 40a is a press belt 37 running on roller or ball bearing arrangement 35. The belt 37 and bearing 35 combination allows movement of the material 38a through the platens 40a while the platens are continuously applying a compressive force to the material 38a. This method of forming a composite wood product is problematic in many ways.

The current continuous press designs impede the application of energy. The press belt, bearing arrangements and necessary lubrication materials represent a significant barrier for the application of heating energy to the product. The heating of the product via a hot platen technology results into an uneven heating profile which in turn yields an uneven density profile throughout the product.

The constant pressure applied also occasionally adversely affects the resulting product. The mat is generally an arrangement of wood elements formed in layers. When pressure is applied, often times there are pockets of air or moisture that gets trapped within the wood layers. As energy is applied, the natural moisture of the wood can form steam pockets in the regions of the trapped air. Subsequently, a blowout or other product defects result, thereby rendering the product unfit for its intended purpose.

Still further, the energy required to pull the material through current press systems is considerable. The constant pressure exerted by these press systems requires significant additional energy to move the material through the press system. The excessive amount of additional energy increases the cost of production thereby ultimately affecting market price for the product.

SUMMARY OF THE INVENTION

The present invention is a method of forming a compressed product. The method includes introducing a material into a press. The material has a flow direction through the press. The press is arranged to have at least one platen oscillating between a compression phase and a release phase. The at least one platen is configured to impart a compressive force onto the material during the compression phase such that the force is applied initially at an acute compression vector angle relative to the material flow direction. As a function of the angled compressive force, the material is transported a distance through the press and then released during the release phase.

The present invention further includes a method of forming a compressed wood product. The method includes introducing a mat assembly of resinated wood elements into a press along a material flow direction. The press is arranged to have at least one platen oscillating between a compression phase and a release phase. The at least one platen is controlled to impart a compressive force at a compression vector angle during the compression phase. The compression vector angle includes a lateral motion component and a vertical motion component. The material is transported a distance through the press along the material flow direction. The distance the material is transported is substantially equal to the lateral motion component. Subsequently, the material is released during the release phase such that a relief region is created between said material and said at least one platen, wherein the at least one platen is out of contact with the material.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
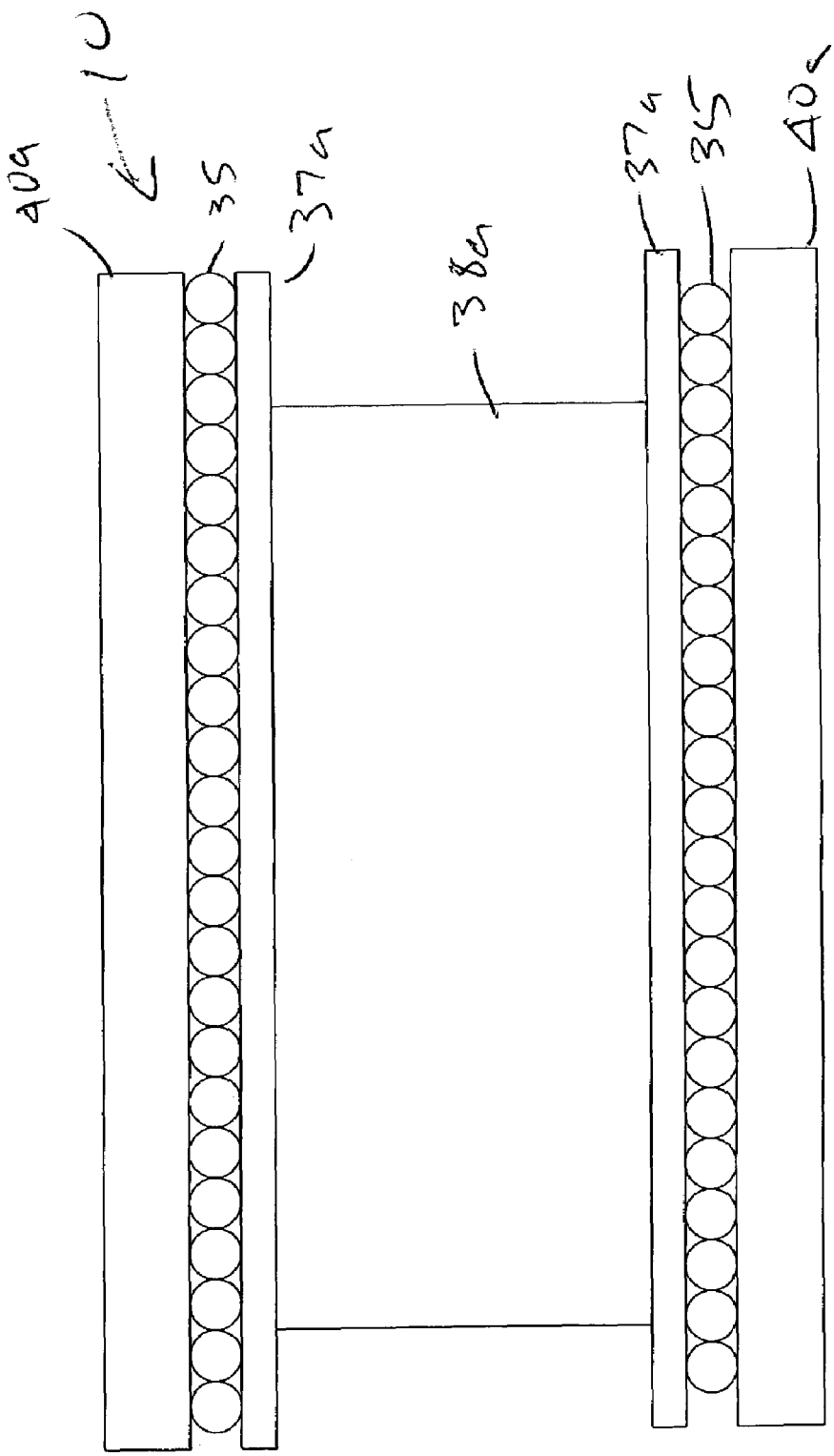
FIG. 1 is a schematic of a press section according to the prior art.

The present invention provides a system and method for forming a compressed material product using an oscillating pressing process. By way of overview, and with references to FIG. 2, one presently preferred embodiment includes a compressed material forming system 20. The compressed material forming system 20 includes an oscillating compression system 22 used to apply an oscillating compressive force to the material 38b. Further, a material temperature control system 24 is used to control the temperature of the material 38b during the forming process. A material transport system 26 is included to move the material through the compressed material forming system 20 as desired. Additionally, a material treatment system 28 is optionally present to treat the material 38b during the forming process. Specific details of the compressed material forming system 20 are described with more particularity below.

The material 38b to be subjected to the treatment of the invention desirably comprise a mat assembly 30 (FIG. 3) of resinated discrete wood elements which can be subjected simultaneously to pressure and heat to form consolidated composite wood products 32. The wood elements may be in any known form. Suitable, non-limiting examples of the wood elements usable with this present invention are wood chips, flakes, strands, veneers, fibers, particles and wafers.

The products 32 (FIG. 3) preferably produced by the present invention are any known consolidated composite wood products 32 presently known in the industry. Suitable product 32 examples include but are not limited to particleboard, oriented strand board, fiberboard, waferboard, plywood, laminated veneer lumber, parallel strand lumber, and laminated beams.

The moisture content of the material 38b prior to treatment by the process of the invention generally will broadly range from about 1% to about 20% by weight. However, this moisture content range is merely a general guideline, and may be departed from. Optimum moisture content for material 38b is preferably determined on a case-by-case basis and it is within the skill of the art to correlate moisture levels with mat assembly 30 dimensions in order to make such determinations. It is possible to treat material 38b having a moisture content approaching zero, but the limited plasticity of wood under such conditions make this less desirable. The moisture content may be augmented by employing a water-containing adhesive.

The resin to be employed in the practice of this invention as it relates to wood is preferably an alkaline phenolic resin. However, it may be any adhesive whose rate of cure is accelerated by the application of heat. Water-soluble and non-water-soluble alkaline and acidic phenolic resins, resorcinol-formaldehyde resins, urea-formaldehyde resins, and isocyanate resins, for example, can be employed. The resin may be applied to material 38b in any desired amount. When employing long wood strands, the resin content will often range from about 1 to about 10% of the dry weight of the wood. Most often, the resin will be applied in an amount ranging from about 2 to about 5% of the dry weight of the wood.

The oscillating press system 22 is arranged to direct the motion of the platens 40b. The oscillation is preferably controlled by a drive mechanism 27 (FIG. 5) configured to enable the oscillating motion of the platens 40b. The drive mechanism 27 includes, among other things, the power sources such as electric motors, petroleum fueled combustion engines, pneumatic or hydraulic power systems or the like along with any suitable connecting structure usable to transmit power to the platens 40b.

Control of the oscillating press system 22 and the drive mechanism 27 is suitably arranged to perform in a number of acceptable manners. For example, in one embodiment, it is performed by a processor or microprocessor (not shown) arranged to perform suitable operations. Any processor known in the art is acceptable, without limitation, a Pentium®—series processor available from Intel Corporation or the like. Alternatively, control of the platens 40b is performed by an electronic computer chip, hydraulic control systems or is performed manually. Accordingly, the scope of the present invention shall not be limited by the manner in which the oscillating motion is generated.

Figure 3:
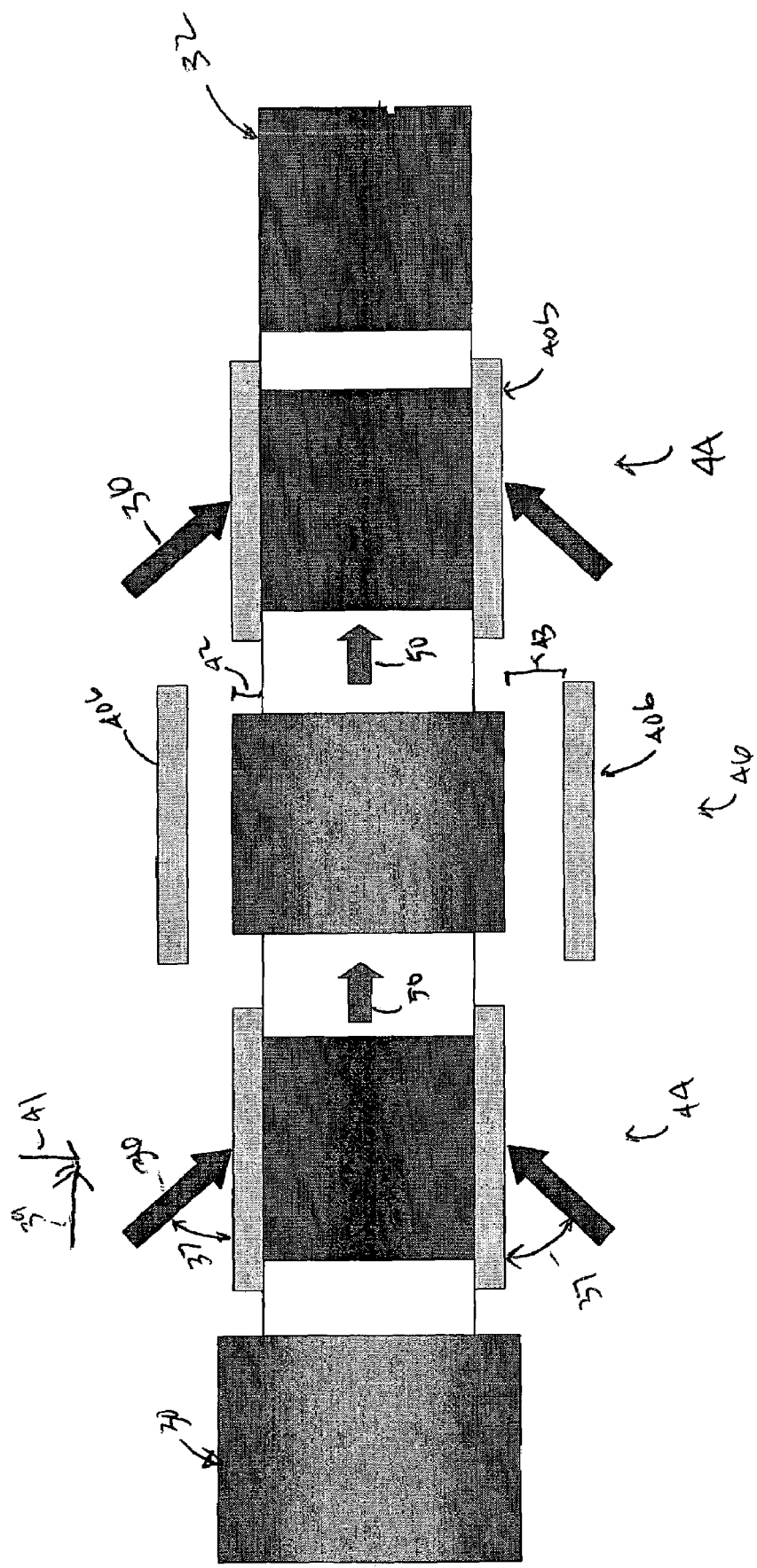
FIG. 3 is a schematic of the oscillating pressing process according to an aspect of the present invention.
Figure 4:
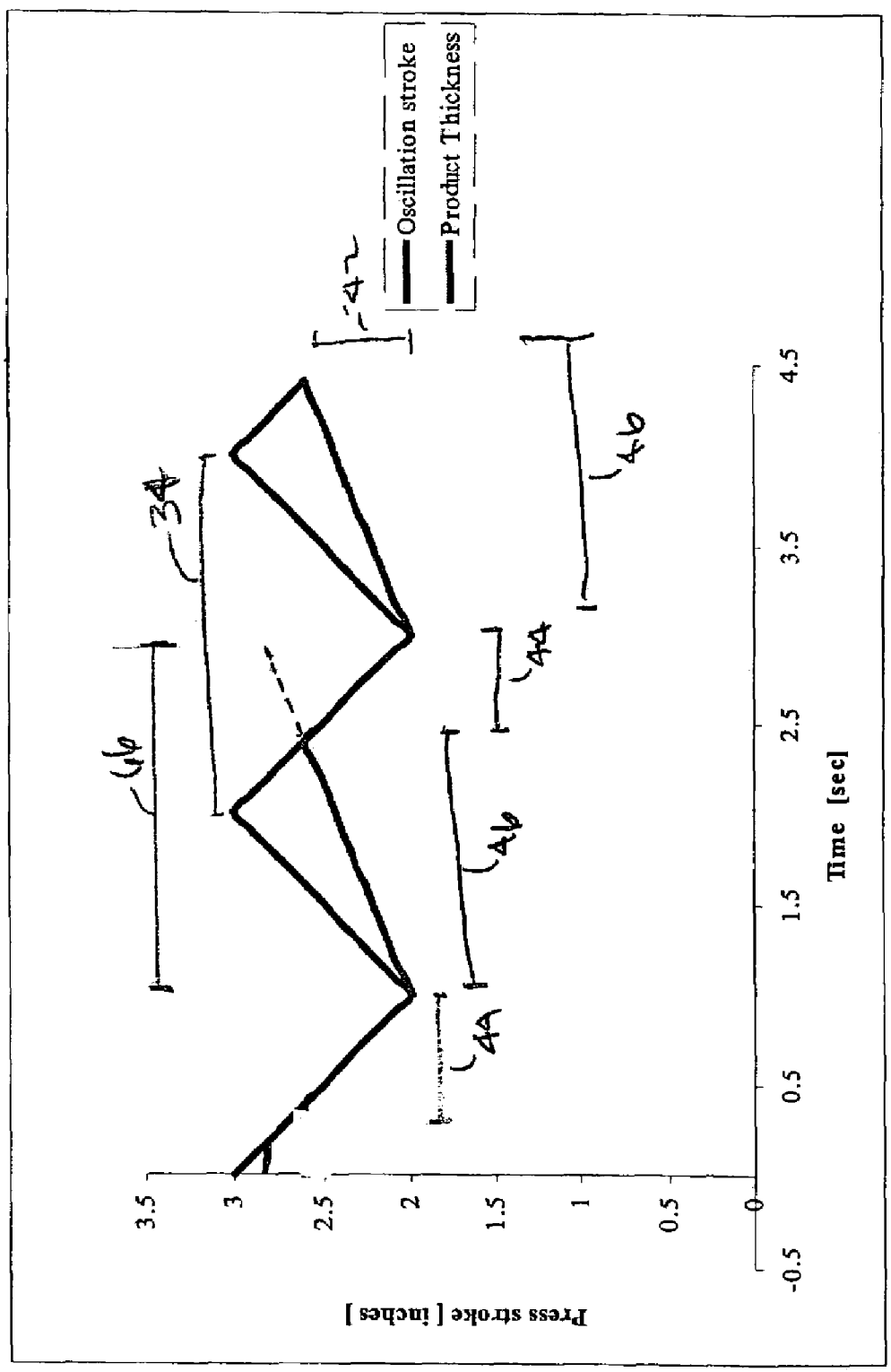
FIG. 4 is a graphical illustration of the relation between press stroke and material thickness over time in accordance with the present invention.

FIGS. 3 and 4, illustrate an oscillating press cycle 34 of the oscillating press system 22. In accordance with the present invention, a single oscillating press cycle 34 includes one full compression phase 44 and one full release phase 46. The compression phase 44 is the phase of the oscillating press cycle 34 wherein the material 38b is under compressive forces from the platens 40b. Conversely, the release phase 46 is the phase of the oscillating press cycle 34 wherein the material 38b is substantially completely free from press applied compressive forces.

The release phase 46 is generated by suitably controlling the motion of at least one of the platens 40b relative to the material 38b. More specifically, after the compression phase 44, at least one of the platens 40b is moved away from the material 38b at a rate that is faster than the rate at which the material 38b is expanding upon release of the compressive forces. During the release phase 46, the material 38b will expand within an elastic region 42 at an expansion rate. The amount of time required for the material 38b to expand to substantially a pre-compressed dimension is the compression recovery response time 66. As will also be appreciated by those skilled in the art, many factors will affect the compression recovery response time 66. For example, without limitation, material dimension, material composition, resin cure state (if relevant), the amount of compression applied to the material 38b, and the size of the desired elastic region 42 are all factors having an affect on the compression recovery response time 66. It will be appreciated by those skilled in the art that material 38b will be suitably supported on at least one end of the material 38b in order to create the relief region 43 between the material 38b and the lower platen 40b. Additionally, any other known structure are employable to support the material 38b through the oscillating pressing system 20.

The oscillating press cycle 34 is preferably selected to occur at a frequency wherein the release phase 46 is less than the compression recovery response time 66 for the material 38b. More specifically, at least one platen 40 is suitably controlled to release the material 38b and subsequently recompress the material 38b at a rate faster than the material's compression recovery response time 66. As discussed above, a variety of factors affect the material's compression recovery response time 66. As such, the determination of a suitable compression recovery response time 66 for a given material is known by those skilled in the art.

Although the scope of the present invention is not intended to be limited by the range of frequencies for the release phase 46, a preferably range of frequencies has been found to achieve desirable results when used in accordance with the present invention. In a particular embodiment, the oscillating press cycle 34 of the present invention is preferably operated between about 1 Hz to about 400 Hz.

In accordance with this invention, a relief region 43 is created during the release phase 46 as the platens 40b pulls away from the material 38b at a rate faster than the material 38b is expanding. As best seen in FIG. 4, the stroke 62 of the platens 40b relative the material thickness 64 is suitably chosen to produce, among other things, the desired relief region 43. Those skilled in the art will appreciate that the relief region 43 is preferably sized to accommodate a suitable release phase 46. Additionally, the relief region 43 is sized to allow repositioning of the platens 40b without affecting the movement of the material 38b through the compressed material forming system 20.

As best seen in FIG. 3, a compression vector 36 depicts the resultant motion vector of the platens 40b at a moment in time substantially equal to the initiation of the compression phase 44. In a presently preferred embodiment, the compression vector 36 is suitably at a compression vector angle 37 relative to the material flow direction 50. The compression vector angle 37 will suitably include a lateral component 39 that reflects instantaneous platen motion in a lateral direction, a direction substantially parallel to the plane of the material flow direction 50. Additionally, the compression vector angle 37 includes a vertical component 41 indicating similar motion along a vertical direction, a direction substantially perpendicular to the plane of the material flow direction 50.

With reference to FIG. 3 and to discussions below, a compression vector angle 37 from about 5 degrees to about 85 degrees will be associated with movement of the material 38*b* in a first direction. Further, at a compression vector angle of about 95 degrees to about 175 degrees is associated with movement of the material 38*b* in a second direction, substantially opposite of the first direction.

In a presently preferred embodiment the compression vector angle 37 is within a range of about 30 degrees to about 60 degrees. However, smaller and larger compression vector angles 37 are considered within the scope of this invention. More specifically, the present invention has been found to function with a compression vector angle 37 of about 5 degrees to about 85 degrees, relative to the material flow direction 50.

Given the circular motion of the platens 40*b*, it has also been determined that a compression vector angle of about 95 degrees to about 175 degrees is also usable with the present invention. Obviously, a compression vector angle 37 within this range would result in the reversal of the material flow direction 50. More specifically, a second material flow direction 51, substantially opposite to the first material flow direction 50, is achieved. It will be appreciated by those skilled in the art, the oscillating pressing system 20 may be controlled in this manner as a means or reheating or recompressing the material 38*b*. A more detailed discussion of platen motion and the resulting material transport is discussed below.

Figure 5:
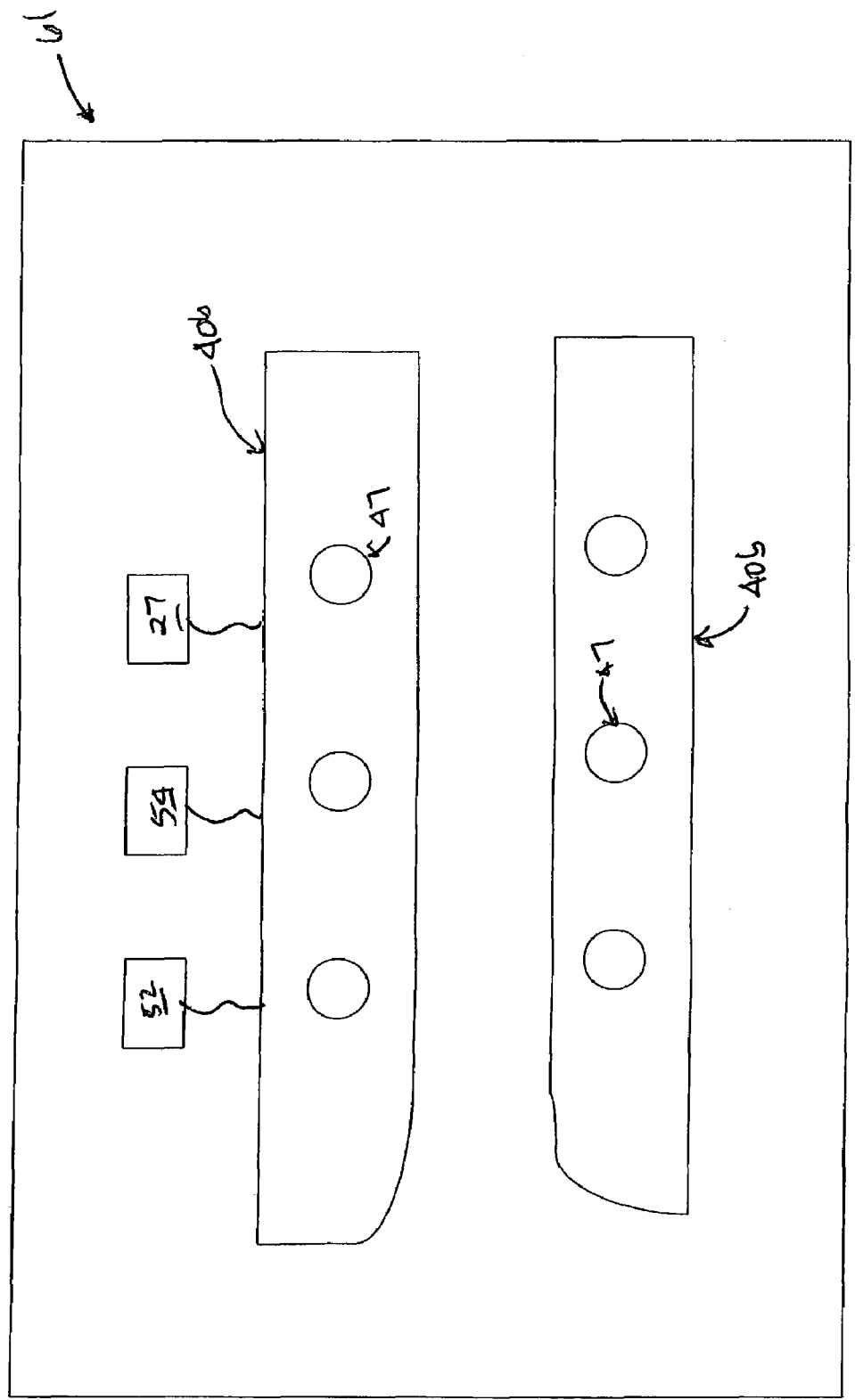
FIG. 5 is a side view of the press platens in accordance with an aspect of the present invention; and, FIG. 6 is a perspective view of an eccentric shaft made in accordance with a further aspect of the present invention.

FIG. 5 depicts an aspect unique to the present invention. The platens 40*b* do not include the press belt and bearing structure (not shown) associated with conventional press configurations. Rather, the platens 40*b* are configured to directly contact the material 38*b* during the pressing process. In this manner, oscillating pressing system 20 does not suffer the thermal losses associated with heating of any bearing structure or press belts (not shown) common to current press system designs. It should be noted, that the platens 40*b* may be lined with a material, such as stainless steel (not shown), to help control microwave energy distribution, if relevant. However, the temperature control system 24, discussed in more detail below, is suitable configured to eliminate the need for heating of any platen lining material (not shown) to achieve adequate temperature control of the material 38*b*.

The platens 40*b* are typically aluminum or other metal formed to include a tapered entrance section 48 configured to receive the mat assembly 30 as it enters the oscillating pressing system 20. The amount of the taper is suitably determined by those skilled in the art. However, in a particular embodiment of the present invention, a taper of about 7 degrees was found to be sufficient. However, platens 40*b* with entrance regions 48 having greater or lesser tapers are considered within the scope of this invention. Additionally, platens 40*b* with entrance regions 48 located at opposed ends of the platens 40*b* are also within the scope of this invention (not shown).

The temperature control system 24 is optionally in communication with at least one of the platens 40*b*, and includes structure and components used to apply energy to the material 38*b* in order to control the temperature of the material 38*b*. For example, the temperature control system 24 may be used to bring the material temperature up to a desired temperature, such as a resin cure temperature. Conversely, the temperature control system 24 may be used to selectively cool the material 38*b*. Still further, the temperature control system 24 may be used to both selectively heat and selectively cool the material in accordance with certain aspects of this invention.

The temperature control system 24 includes a temperature control unit 54 that is suitably configured to supply the energy to be used in the specific embodiment. The temperature control unit 54 may take many forms commonly known by those skilled in the art. For example, the temperature control unit 54 may be a microwave generator, radio frequency generator, steam injection generator, hot platen, cold platen, hot fluid generator, cold fluid generator or combinations thereof. For simplicity, the temperature control unit 54 is shown in communication with only on of the platens 40*b*. However, this configuration is not intended to limit the scope of the invention. Rather, those skilled in the art will appreciate that the temperature control unit 54 may be in communication with either platen 40 or both platens 40*b*. Additionally, the temperature control unit 54 may suitably be configured to apply energy along the material's face or side. Still further, the temperature control system 24 may be employed in a pre-press, in-press or post press arrangement.

Those skilled in the art will appreciate, the temperature control unit 54 includes all known structure necessary to utilize the temperature control unit 54. More specifically, if the temperature control unit 54 is a microwave generator, a suitable wave guide generator with suitable microwave windows (not shown) are part of the temperature control unit 54. Similar structures will be used where the temperature control unit 54 is a radio frequency generator or the like. When a steam generator is used, suitable hose and fittings (not shown) will likewise be used and are considered within the scope of this invention.

Figure 2:
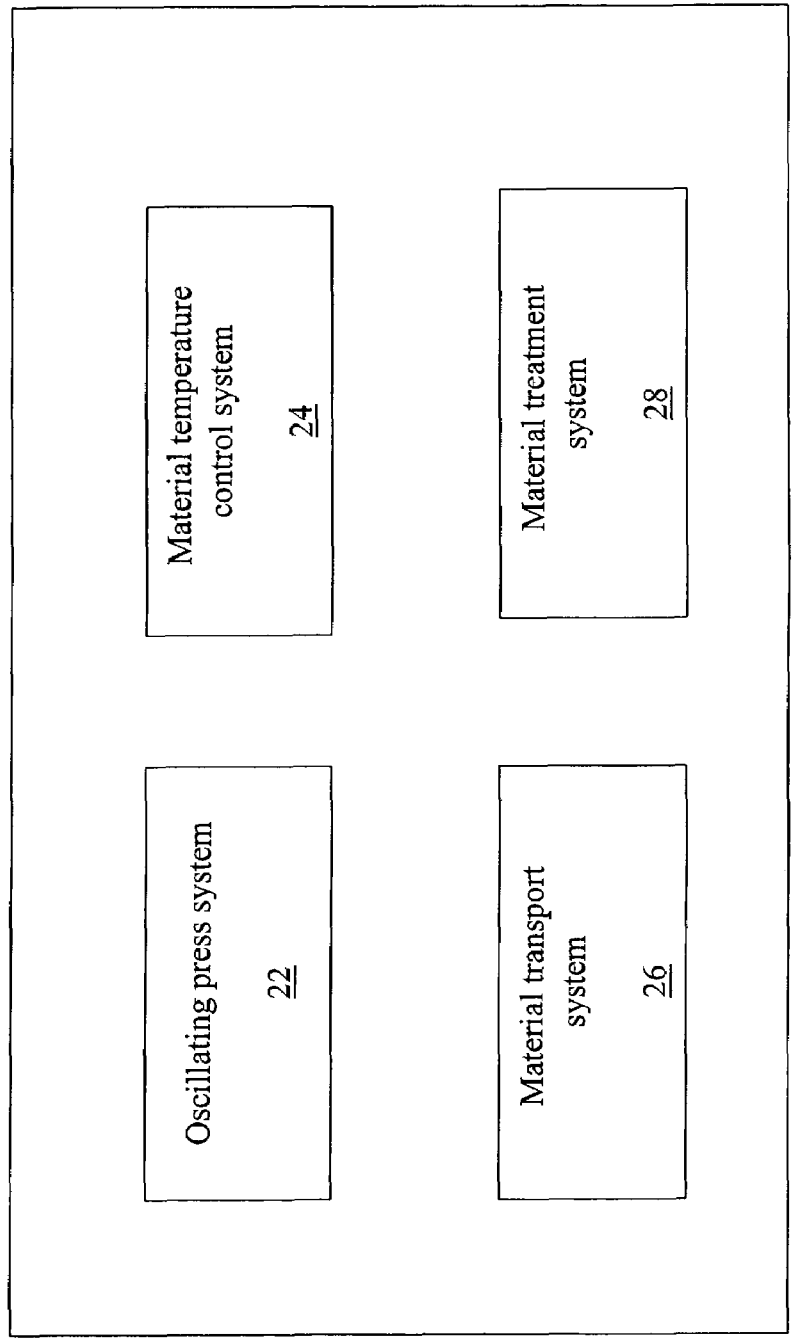
FIG. 2 is a system diagram of the oscillating pressing process according to an embodiment of the present invention.
Figure 6:
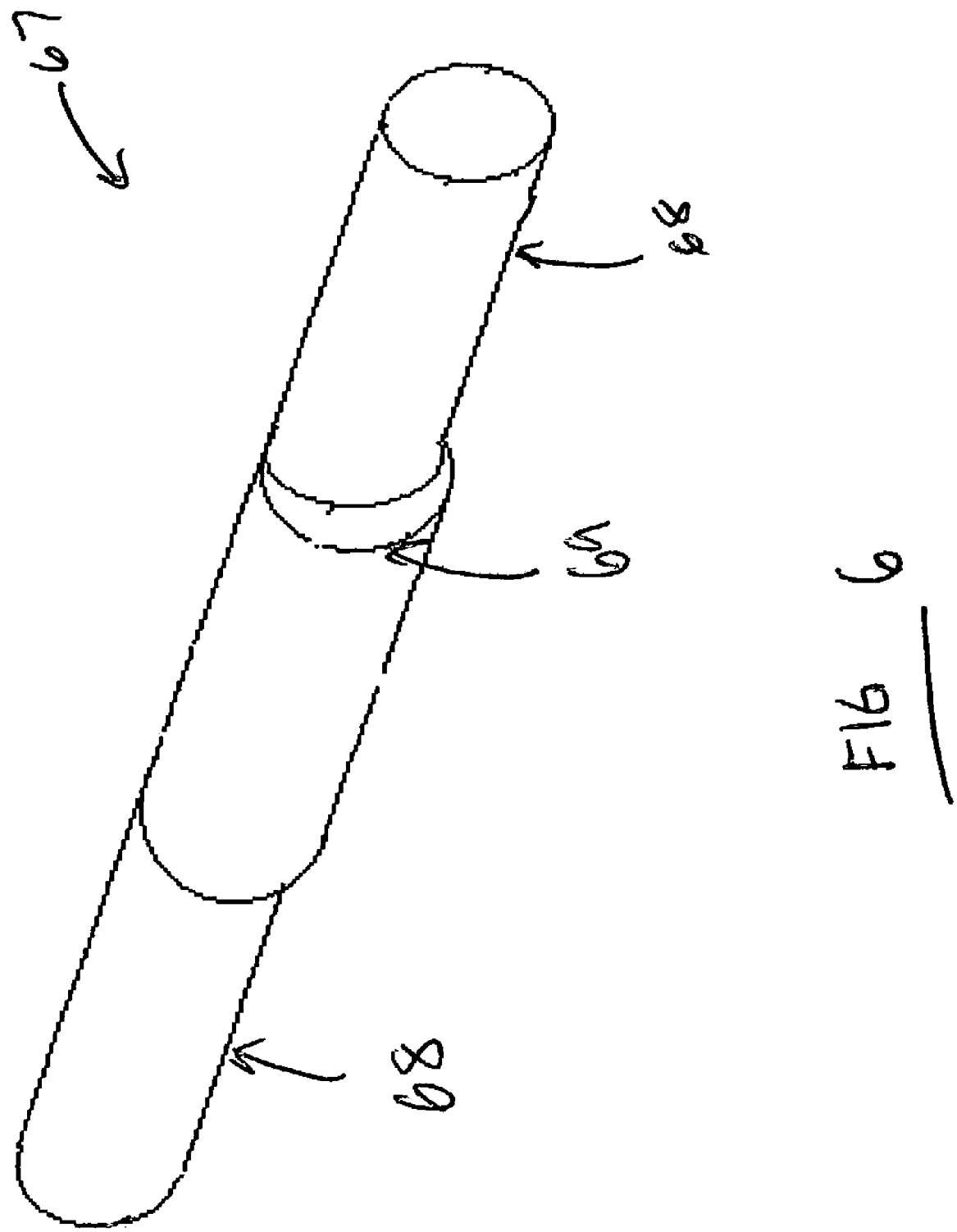

With reference to FIGS. 2, 5 and 6, the material transport system 26 is unique to the design of the present invention. Those skilled in the art will appreciate the function of the material transport system 26 is to move the material 38*b* through the oscillating pressing system 20.

The material transport system 26 is derived from the motion of the oscillating motion of the platens 40*b*. More specifically, the motion of the platens 40*b* controls the transportation of the material 38*b* through the oscillating pressing system 20. As discussed above, and as is best illustrated in FIG. 3, the compression vector angle 37 includes both a vertical motion component 41 and a lateral motion component 39.

An oscillating pressing system 20 having platens 40*b* engaging the material 38*b* at a compression vector angle 37 imparts a novel attribute to the present invention. More specifically, when the lateral motion component 39 of the platens 40*b* coincides with a compression phase 44, the lateral motion component 39 functions to transport the material 38*b* through the press. The material 38*b* is transported through the oscillating pressing system 20 a linear distance that is slightly less than the linear distance traveled by the platens 40*bb* during the compression phase 44. This transportation occurs one time for each oscillating press cycle 34. Simultaneously, the vertical motion component 41 suitably compresses the material 38*b* while the material 38*b* is being transported. Accordingly, no other transportation structure, such as an external tractor means, is required to move the material 38*b* through the oscillating pressing system 20.

An optimal manner in which to control the platen 40 motion to achieve an adequate compression vector angle 37 is to drive the platen 40 in a substantially circular motion. With specific reference to FIGS. 5 and 6, one presently preferred method of achieving the desired motion is to drive the platens 40*b* on an eccentric shaft 67, or similar structure. Such a structure will create substantially circular oscillating motion of the platens 40*b* sufficient to proved transportation and oscillating compression of the material 38*b* through the oscillating pressing system 20.

In a presently preferred embodiment, the platens 40b are each arranged with at least one bore 47 which is suitably arranged to receive an eccentric shaft 67. In a particular embodiment, each platen 40 is configured with three bores 47, each being suitably arranged to receive an eccentric shaft 67. The eccentric shaft 67 includes a journal region 68 and a lobed region 69. The journal region 68 is in communication with a drive mechanism 27 via gearing, belt or direct drive means (not shown). The lobed region 69 is configured to remain substantially internal of the platens 40b and drive them in a substantially circular motion. The lobed region 69 is preferably sufficiently large enough to create enough of a relief region 43 such that the material 38b is not moved in an undesired direction. It is to be noted, however, that although the any give point of the platens 40b will transcribe a substantially circular path, the opposed surfaces of the platens remain parallel to one another at all times.

With specific reference to FIGS. 2 and 5, the material treatment system 28 is preferably configured to treat the material 38b while the material 38b is within the oscillating pressing system 20. The material treatment system 28 includes structure arranged to allow the addition of suitable dyes or colorant materials, fire retardant materials, or preservative materials. However, the nature of the product added by the material treatment system 28 is not intended to limit the scope of the present invention. Consequently, any suitable product may be introduced by the material treatment system 28, including the addition of liquid water. Material treatment systems 28 of the present invention are well known in the art, and as such a detailed description of the structure and methods of operation are not discussed in the present application.

A material treatment unit 52 is suitably configured to control introduction of any treatment product. The form of the material treatment unit 52 is not intended to limit the present invention. Thus, any known structure is usable as a material treatment unit 52. For example, the material treatment unit may be a reservoir with suitable pumps, metering devices, sensing devices etc. commonly used with the temporary storage and disposition of the various treatment products according to this invention.

As with the temperature control unit 54 discussed above, the material treatment unit 52 suitably includes any structure necessary to enable the material treatment unit 52 to function as it is intended. For example, the material treatment unit 52 includes any hose, conduit, nozzle, diffuser or pathway utilized by the material treatment unit 52 in the delivery of the treatment product to the material 38b.

In a presently preferred embodiment the material treatment system 28 is configured to introduce the product onto the material 38b within the oscillating pressing system 20 during the release phase 46. However, the material treatment system 28 may be configured to introduce the product before, during or after the material is within the oscillating pressing system 20.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of forming a compressed product comprising:

introducing a material into a press, the material having a material flow direction through the press, the press having at least one platen oscillating between a compression phase and a release phase;

imparting a compressive force from said at least one platen to said material during said compression phase, said compressive force being at an acute compression vector angle relative to said material flow direction to transport said material horizontally through the press in the material flow direction; and releasing the material during said release phase.

2. The method of claim 1, wherein the at least one platen is traveling a substantially circular path.

3. The method of claim 1, wherein at least one eccentric shaft is configured to control the motion of the at least one platen.

4. The method of claim 1, wherein the release phase is configured to form a relief region between the at least one platen and the material.

5. The method of claim 1, further comprising controlling the temperature of the material by applying at least one of a steam injection, microwave energy, radio frequency, hot platen, cold platen, hot fluid and cold fluid.

6. The method of claim 1, wherein the material is a mat assembly of resinated discrete wood elements.

7. The method of claim 6, wherein the wood element is at least one of a chip, flake, strand, veneer, fiber, particle and wafer.

8. The method of claim 1, wherein the compressed product is at least one of an oriented strand board, plywood, oriented strand lumber, oriented veneer lumber, fiber board, wafer board and laminated beam.

9. The method of claim 1, wherein the compression vector angle is at an angle of about 5 degrees to about 85 degrees relative to said material flow direction.

10. The method of claim 1, wherein the compression vector angle is at an angle of about 30 degrees to about 60 degrees relative to said material flow direction.

11. The method of claim 1, further comprising, treating the mat assembly with at least one of a dyes or colorant materials, fire retardant materials, preservative materials and liquid water.

12. A method of forming a compressed wood product, comprising:

introducing a mat assembly of resinated wood elements into a press, the material having a material flow direction through the press, the press having at least one platen oscillating between a compression phase and a release phase;

controlling the at least one platen during the compression phase to impart a compressive force on the mat assembly, the compressive force being at a compression vector angle relative to the material flow direction, the compressive vector angle having a lateral motion component and a vertical motion component, the lateral motion component and the vertical motion component being configured to transport the material a distance through the press along the material flow direction, the distance being substantially equal to the lateral motion component; and releasing the material during the release phase such that a relief region is created between said material and said at least one platen.

13. The method of claim 12, wherein the at least one platen is traveling a substantially circular path.

14. The method of claim 13, wherein at least one eccentric shaft is configured to control the motion of the at least one platen.

15. The method of claim 12, further comprising controlling the temperature of the material by applying at least one of a steam injection, microwave energy, radio frequency, hot platen, cold platen, hot fluid and cold fluid.

16. The method of claim 12, wherein the wood element is at least one of a chip, flake, strand, veneer, fiber, particle and wafer.

17. The method of claim 12, wherein the compressed product is at least one of an oriented strand board, plywood, oriented strand lumber, oriented veneer lumber, fiber board, wafer board and laminated beam.

18. The method of claim 12, wherein the compression vector angle is at an angle of about 5 degrees to about 85 degrees relative to said material flow direction.

19. The method of claim 12, wherein the compression vector angle is at an angle of about 30 degrees to about 60 degrees relative to said material flow direction.

20. The method of claim 12, further comprising, treating the mat assembly with at least one of a dyes or colorant materials, fire retardant materials, preservative materials, or liquid water.

* * * * *